United States Patent
Kershaw et al.

(10) Patent No.: US 7,886,098 B2
(45) Date of Patent: *Feb. 8, 2011

(54) MEMORY ACCESS SECURITY MANAGEMENT

(75) Inventors: Daniel Kershaw, Cambridge (GB); Stuart David Biles, Little Thurlow (GB)

(73) Assignee: ARM Limited, Cambridge (GB)

( * ) Notice: Subject to any disclaimer, the term of this patent is extended or adjusted under 35 U.S.C. 154(b) by 456 days.

This patent is subject to a terminal disclaimer.

(21) Appl. No.: 11/898,640

(22) Filed: Sep. 13, 2007

(65) Prior Publication Data

US 2008/0071953 A1    Mar. 20, 2008

(30) Foreign Application Priority Data

Sep. 13, 2006    (GB) ................... 0618042.6

(51) Int. Cl.
*G06F 13/00* (2006.01)
*G06F 13/28* (2006.01)
*H04L 29/06* (2006.01)
*H02H 9/00* (2006.01)

(52) U.S. Cl. .............. 710/110; 711/163; 711/173; 713/164; 361/1

(58) Field of Classification Search ......... 710/110; 711/163, 173; 713/164; 361/1
See application file for complete search history.

(56) References Cited

U.S. PATENT DOCUMENTS

| | | | | |
|---|---|---|---|---|
| 4,580,246 A | * | 4/1986 | Sibigtroth | 365/195 |
| 5,557,743 A | * | 9/1996 | Pombo et al. | 726/23 |
| 5,572,686 A | * | 11/1996 | Nunziata et al. | 710/116 |
| 5,615,263 A | * | 3/1997 | Takahashi | 713/164 |
| 5,809,544 A | * | 9/1998 | Dorsey et al. | 711/163 |
| 6,820,177 B2 | * | 11/2004 | Poisner | 711/152 |
| 6,922,740 B2 | * | 7/2005 | Kondratiev et al. | 710/22 |
| 7,054,121 B2 | * | 5/2006 | Koschella | 361/1 |
| 7,120,771 B2 | * | 10/2006 | Dahan et al. | 711/163 |
| 7,284,106 B1 | * | 10/2007 | Fernald | 711/163 |
| 7,636,844 B2 | * | 12/2009 | Bajikar | 713/171 |

(Continued)

FOREIGN PATENT DOCUMENTS

GB    2409745    7/2005

(Continued)

OTHER PUBLICATIONS

European Search Report dated Nov. 15, 2006.

*Primary Examiner*—Mark Rinehart
*Assistant Examiner*—Christopher A Daley
(74) *Attorney, Agent, or Firm*—Nixon & Vanderhye P.C.

(57) ABSTRACT

A data processing apparatus and method for generating access requests is provided. A bus master is provided which can operate either in a secure domain or a non-secure domain of the data processing apparatus, according to a signal received from external to the bus master. The signal is generated to be fixed during normal operation of the bus master. Control logic is provided which, when the bus master device is operating in a secure domain, is operable to generate a domain specifying signal associated with an access request generated by the bus master core indicating either secure or non-secure access, in dependence on either a default memory map or securely defined memory region descriptors. Thus, the bus master operating in a secure domain can generate both secure and non-secure accesses, without itself being able to switch between secure and non-secure operation.

12 Claims, 5 Drawing Sheets

U.S. PATENT DOCUMENTS

| | | | |
|---|---|---|---|
| 2002/0184046 A1* | 12/2002 | Kamada et al. | 705/1 |
| 2003/0018892 A1* | 1/2003 | Tello | 713/164 |
| 2003/0140238 A1* | 7/2003 | Turkboylari | 713/193 |
| 2004/0243823 A1* | 12/2004 | Moyer et al. | 713/200 |
| 2008/0046762 A1* | 2/2008 | Kershaw et al. | 713/193 |
| 2008/0172749 A1* | 7/2008 | Ko et al. | 726/27 |

FOREIGN PATENT DOCUMENTS

| | | |
|---|---|---|
| GB | 2411027 | 8/2005 |
| WO | WO 2004/046934 | 6/2004 |

\* cited by examiner

MEMORY ACCESS SECURITY MANAGEMENT

This application claims priority to GB 0618042.6 filed Sep. 13, 2006, the entire contents of which are hereby incorporated by reference.

BACKGROUND OF THE INVENTION

1. Field of the Invention

The present invention relates to data processing apparatuses and methods, and in particular to managing accesses to secure and non-secure data in memory.

2. Description of the Prior Art

It is often the case that the data items (e.g. instructions or data values) used by at least one of the applications running on a processor are sensitive data items that should not be accessible by other applications that can be run on the processor. An example would be where the data processing apparatus is a smart card, and one of the applications is a security application which uses sensitive data, such as for example secure keys, to perform validation, authentication, decryption and the like. It is clearly important in such situations to ensure that such sensitive data are kept secure so that they cannot be accessed by other applications, for example hacking applications that have been loaded onto the data processing apparatus with the purpose of seeking to access those secure data.

In known systems, it has typically been the job of the operating system developer to ensure that the operating system provides sufficient security to ensure that the secure data of one application cannot be accessed by other applications running under the control of the operating system. However, as systems become more complex, the general trend is for operating systems to become larger and more complex, and in such situations it becomes increasingly difficult to ensure sufficient security within the operating system itself.

As a consequence, to seek to alleviate the reliance on operating system security, it is known to provide a system in which the data processing apparatus is provided with separate domains, these domains providing a mechanism for handling security at the hardware level. Such a system is described for example in commonly assigned co-pending U.S. Pat. No. 7,305,534, the contents of which are herein incorporated by reference, this application describing a system having a secure domain and a non-secure domain. In that system, the non-secure and secure domains in effect establish separate worlds, with the secure domain providing a trusted execution space separated by hardware enforced boundaries from other execution spaces, and likewise the non-secure domain providing a non-trusted execution space. A program executing in a specified non-secure domain does not have access to data identified as secure. Each access request then has a domain security signal associated therewith identifying whether the access is a secure access or a non-secure access.

If the data processing apparatus contains a storage device (e.g. a cache) which is accessible to programs executing either in a secure or a non-secure domain, then mechanisms need to be in place to ensure that data stored in such a device for access by a program operating in a secure domain is not accessible to a program operating in a non-secure domain. Commonly assigned U.S. Pat. No. 7,340,573, the contents of which are herein incorporated by reference, describes a data processing apparatus, in which an additional flag is set in a cache line, indicating the security of the corresponding data. When a cache line's worth of data is written in the cache (typically as part of a linefill process), the associated flag is set to identify whether the data pertains to a secure memory access or to a non-secure memory access. Access to a data item in the cache is then restricted by reference to the flag, such that an access request whose domain security signal indicates it is a secure access can only reference secure cache lines as indicated by the associated flag(s), and similarly an access request whose domain security signal indicates it is a non-secure access can only reference non-secure cache lines as indicated by the associated flag(s). Such an approach hence prevents a process operating in the non-secure domain from accessing any entries in the cache whose associated flag indicates that it contains secure data. This provision avoids the need to flush the cache prior to a processor which has access thereto making a transition from secure domain operation to non-secure domain operation.

Whilst such systems serve to protect the security of the secure data, it may in fact be the case that some sharing of data between secure and non-secure domains is desirable. One example of this would be a decryption process, which itself must operate in the secure domain, but produces decrypted data which it may be appropriate to make accessible to non-secure processes. Such data should be written to a non-secure memory region from where it can be accessed by the non-secure process.

It is known to provide processors which can operate in both secure and non-secure domains (with special monitor code being used to manage the transition from one domain to the other). In one such system a program operating in the secure domain can issue an access request to non-secure memory and mark that data access request as non-secure even though it is issued from the secure domain. This enables a secure process to write data to a non-secure memory location and, if that data is held in the cache, for the flag of the relevant cache line to be marked as non-secure, such that a subsequent non-secure process executing on the processor (or indeed on a different processor) may have access to it from the cache.

However, the complexity of a processor which supports both secure and non-secure domains may be not only unnecessary for many applications, but also may present a potential security vulnerability, since its ability to execute processes in either the secure or the non-secure domain could be the subject of a hacking attack. Furthermore it would be advantageous to avoid having to provide the additional logic associated with the ability of a processor to operate in both secure and non-secure domains. However, a processor which is fixed in one security domain (e.g. the secure domain) will not have the ability to generate different domain security signals, and indeed will not typically be aware of the multiple domains within the system. Accordingly this causes a problem if data used by that fixed domain processor is to be shared with another processor operating in another domain. Assuming by way of example that a fixed domain processor was operating in the secure domain, all access requests emanating from it could be tagged externally as secure accesses. If data is to be shared with a non-secure process, such secure accesses would need to be allowed to access non-secure memory regions. However, even if such accesses are allowed, a problem arises if a cache is used, since any data stored in the cache as a result of the activities of the fixed secure processor will have the corresponding cache line flag marked as secure, and hence won't be visible to the non-secure process. One possible solution to this problem would be to cause this processor to use a non-cacheable region of non-secure memory which would allow both secure and non-secure accesses, yet this solution forfeits the speed gain and power saving benefits of using a cache.

Accordingly, it would be desirable to provide a technique which enabled a simplified processor to operate without the ability itself to transition between security domains, yet retain flexible operation within a data processing apparatus where both secure and non-secure domains and data exist.

SUMMARY OF THE INVENTION

Viewed from a first aspect, the present invention provides a data processing apparatus having a plurality of domains in which devices of the data processing apparatus can operate, said plurality of domains comprising at least one non-secure domain and at least one secure domain, in the secure domain said devices having access to secure data not accessible from the non-secure domain, comprising: a bus master device fixed in a particular domain and operable to issue an access request when access to data is required, the access request specifying an address for said data; a bus over which said access request is routed to a slave device, each access request routed over the bus having a domain security signal associated therewith identifying a domain pertaining to that access request; and said bus master device having domain control logic operable to receive a domain specifying signal generated externally to the bus master device to identify the domain in which the bus master device is fixed, if that domain specifying signal indicates that the bus master device is fixed in the secure domain the domain control logic being operable to selectively generate, in dependence on said address specified by said access request, a non-secure domain security signal to be associated with said access request.

In accordance with the present invention the data processing apparatus has at least one secure and one non-secure domain, with data within the data processing apparatus labelled as secure being inaccessible to processes executing in the non-secure domain. A bus master device receives a signal on an external line which determines whether it operates in the secure or non-secure domain. This signal "fixes" the bus master to operate in either the secure or the non-secure domain. When the bus master device issues an access request to be routed via a bus to a slave device, domain control logic is operable to generate a domain specifying signal associated with the access request. If the bus master device is operating in the secure domain, the domain control logic, in dependence on the address specified by the access request, can generate a non-secure domain specifying signal.

Having its security domain specified by an external signal simplifies the logic which must be provided within the bus master device. Furthermore since its security domain is not specified internally to the bus master device, the bus master device can be trusted to behave as the system designer intended, since whatever malicious code a hacker might manage to execute on the bus master device, switching security domain (in particular switching from non-secure to secure) is not an option. Also, by means of its domain control logic, for secure (and therefore trusted) processes, selected access requests can be labelled as non-secure in an address dependent manner, despite originating from a secure domain. This enables the secure process to write data to a storage location defined as a non-secure location, or to store data in a shared resource, such as a cache, and label it as non-secure data, such that later a non-secure process may access that data.

In one embodiment, the domain control logic has access to a memory map identifying access control information for each of a number of memory regions and an indication of the domain security signal that should be issued in association with an access request specifying an address within that memory region if the access request is issued by the bus master device whilst operating in the secure domain.

Accordingly, when the bus master device is operating in the secure domain, access requests may be successfully issued not only to regions of memory designated as secure, but also to those designated as non-secure, by reference to the memory map, which allows the bus master to "know" the appropriate security of all areas of the memory map.

In another embodiment the domain control logic has access to region descriptors, each region descriptor being associated with a memory region and providing a region security indication for that memory region, said region descriptors being programmable by predetermined software executing in the secure domain, said domain control logic being operable to derive said domain security signal for each access request from a combination of said domain specifying signal and said region security indication of the region descriptor for the memory region containing the address specified by the access request.

Thus, particular regions of memory can have their access permissions and region attributes specified by a corresponding region descriptor, which can be edited by trusted software. The region descriptor for a particular memory region will typically provide one or more region attributes, identifying for example whether accesses to that region are cacheable, bufferable, etc., and in addition will typically specify one or more access permissions, for example identifying whether the region in question is only accessible when the processor core is in a predetermined operating mode, and if it is accessible whether read and write accesses are allowed or whether only read accesses are allowed, etc. In this way, the security status of a particular region of memory can be altered dynamically, as needs require during the operation of the data processing apparatus.

In a preferred embodiment, the domain control logic is operable to generate said domain security signal in dependence on said region security indication when said domain specifying signal indicates that the bus master device is fixed in the secure domain. In this manner, the ability of the bus master device to adapt the security of the domain security signals that accompany its access requests according to the corresponding region descriptors is only invoked when operating in the secure domain.

Whilst it will be appreciated that the relative priorities of the aforementioned mechanisms for generating domain security signals could be variable, in a preferred embodiment if said address is in a memory region having a region descriptor, said domain security signal is derived from said combination of said region security indication and said domain specifying signal, whereas otherwise said domain security signal is derived from said access control information obtained from said memory map.

In a preferred embodiment, said domain control logic is operable to always generate said domain security signal as non-secure, when said domain specifying signal indicates that the bus master device is fixed in the non-secure domain. Thus, only a bus master device operating in the secure domain is capable of adjusting the security of the domain security signals that accompany its access requests.

In one embodiment the domain specifying signal is a static input to said bus master device. Hence, the bus master device is permanently hard-wired to be in one particular security domain and cannot be switched to another security domain.

Whilst it will be appreciated that there are many ways in which the domain specifying signal could be generated, in one embodiment the data processing apparatus further comprises security control logic operable to generate said domain specifying signal. Thus the security control logic has control over the security domain in which the bus master device is fixed to operate and can direct the definition of this security domain in accordance with trusted, system-designer specified rules. Such a trusted rule is demonstrated by one embodiment in which the domain specifying signal is only changeable on reset of said bus master device.

It will be appreciated that the bus master device being fixed in a particular security domain means that it cannot make transitions between secure and non-secure domains during its operation. There may however be very limited circumstances in which a single transition, from a secure domain to a non-secure domain may be possible. In particular in one embodiment the bus master device begins operation in the secure domain at boot-time, said security control logic is operable to switch to generating a non-secure domain specifying signal later in the boot process and said security control logic is operable thereafter to only produce a non-secure domain specifying signal until a reboot occurs.

In this way, when the data processing apparatus boots, the bus master device may briefly operate in the secure domain, whilst trusted boot code is executed, but then before or at the time that boot code completes, the bus master device is put into non-secure mode and cannot switch back to secure mode, without a reboot. This ensures that during the time that the bus master is allowed to operate in the secure domain, which it may be advantageous to allow it briefly to do for set-up purposes at boot-time, does not pose a vulnerability since only trusted boot code is being executed and the bus master device is irreversibly switched into the non-secure domain before that boot code completes.

In one embodiment the bus master device itself may be able to initiate the reboot process via some more trusted element within the system (for example code executing on a processor within the secure domain). In these limited circumstances, the bus master device can initiate an authenticated reboot to cause a transition from the non-secure domain to the secure domain. The trusted code with which the bus master device authenticates is used to ensure that this functionality can only be initiated by valid, un-hacked code.

Viewed from a second aspect, the present invention provides a data processing apparatus having a plurality of domains in which devices of the data processing apparatus can operate, said plurality of domains comprising at least one non-secure domain and at least one secure domain, in the secure domain said devices having access to secure data not accessible from the non-secure domain, comprising: bus master means fixed in a particular domain and for issuing an access request when access to data is required, the access request specifying an address for said data; bus means over which said access request is routed to slave device means, each access request routed over the bus means having a domain security signal associated therewith identifying a domain pertaining to that access request; and said bus master means having domain control logic means for receiving a domain specifying signal generated externally to the bus master means to identify the domain in which the bus master means is fixed, if that domain specifying signal indicates that the bus master means is fixed in the secure domain the domain control logic means selectively generating, in dependence on said address specified by said access request, a non-secure domain security signal to be associated with said access request.

Viewed from a third aspect, the present invention provides a method of generating access requests in a data processing apparatus having a plurality of domains in which devices of the data processing apparatus can operate, said plurality of domains comprising at least one non-secure domain and at least one secure domain, in the secure domain said devices having access to secure data not accessible from the non-secure domain, comprising the steps of: generating a domain specifying signal externally to a bus master device to identify the domain in which the bus master device is fixed; issuing from said bus master device an access request when access to data is required, said access request specifying an address for said data; associating a domain security signal with said access request, identifying a domain pertaining to that access request; and if said domain specifying signal indicates that said bus master device is fixed in said secure domain, selectively generating, in dependence on said address, a non-secure domain security signal to be associated with said access request.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
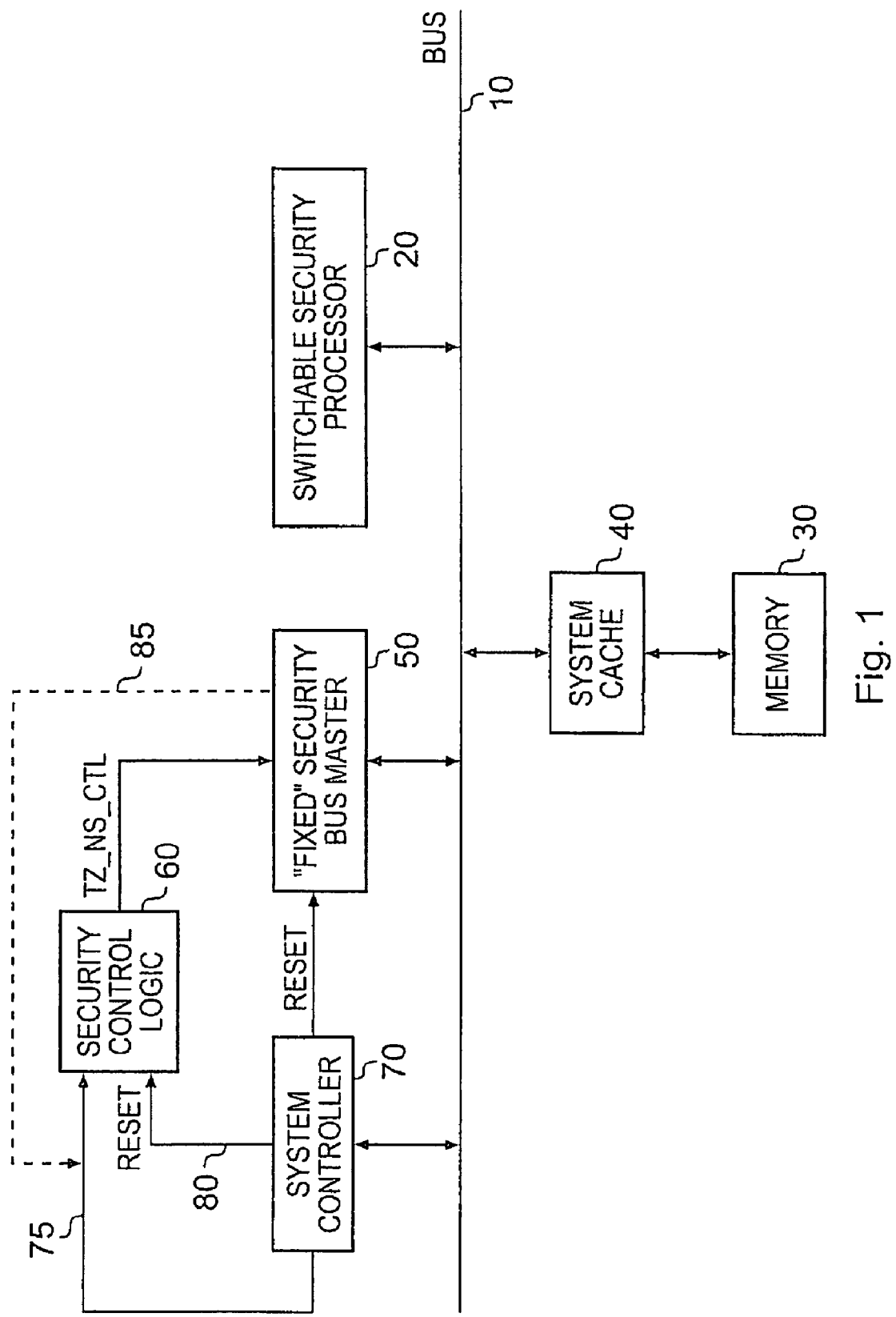
FIG. 1 is a block diagram of a data processing apparatus in accordance with one embodiment of the present invention.

FIG. 1 is a block diagram of a data processing apparatus in accordance with one embodiment of the present invention. A bus 10 connects the various components of the data processing apparatus and allows them to communicate with each other, in particular by passing a data access request from a master device to a slave device and either passing data items to be written from the master device to the slave device or returning requested read data items from the slave device to the master device. Switchable security processor 20 is an example of a bus master device which can issue access requests. In addition, switchable security processor 20 can operate in either a secure domain or a non-secure domain. When operating in the secure domain it has access to data within the data processing apparatus which are labelled as secure data. The main storage location for data items in the data processing apparatus is memory 30 which is connected to bus 10 via system cache 40. "Fixed" security bus master 50 can also operate either in the secure domain or the non-secure domain. However, this bus master itself does not have control over the security domain in which it operates, having its security domain defined by the signal TZ_NS_CTL which it receives from security control logic 60.

Security control logic 60 ensures that the TZ_NS_CTL signal remains constant during normal operation of bus master 50, indeed in one embodiment the TZ_NS_CTL signal is "hard-wired" to be either high or low (i.e. permanent non-secure domain or secure domain operation). More generally, security control logic 60 is controlled by system controller 70 which signals to security control logic 60 over path 75.

In one example, the bus master 50 may be a "helper" processor providing services to another "master" processor, such as cryptographic encoding or decoding. In this example the bus master would operate continuously in the secure domain, since it is handling sensitive data such as cryptographic keys. Hence, security control logic 60 will provide a continuous TZ_NS_CTL=0 (secure) signal.

In another example, whilst the security domain of bus master 50 may be fixed during its normal operation, there may be very limited circumstances in which allowing a single one-way security domain transition of bus master 50 may be useful. For example, bus master 50 may operate in the secure domain during booting of the data processing apparatus, but thereafter during normal operation of the data processing apparatus bus master 50 may continue operation in the non-secure domain. In order to ensure that such a transition is one-way, in this example security control logic 60 is arranged such that only one security domain transition signal received on path 75 during boot time, indicating a transition from secure to non-secure, is responded to and thereafter security control logic 60 will produce a continuous and unchanging non-secure TZ_NS_CTL signal regardless of changes in the signal on path 75, until a reset signal is received from system controller 70 on path 80.

When bus master 50 is operating in the secure domain (for example during the data processing apparatus boot routine) it may be advantageous to allow bus master 50 to signal its own transition to the non-secure domain. For this reason temporary path 85 is available during boot time only, so that bus master 50 can directly trigger the change of TZ_NS_CTL signal from security control logic 60. Hence, as soon as bus master 50 no longer needs to operate in the secure domain (for example once it has completed its boot routine) it can immediately switch to non-secure operation. Switching to secure operation is then not possible until system controller 70 resets both the security control logic 60 and the bus master 50.

Figure 2:
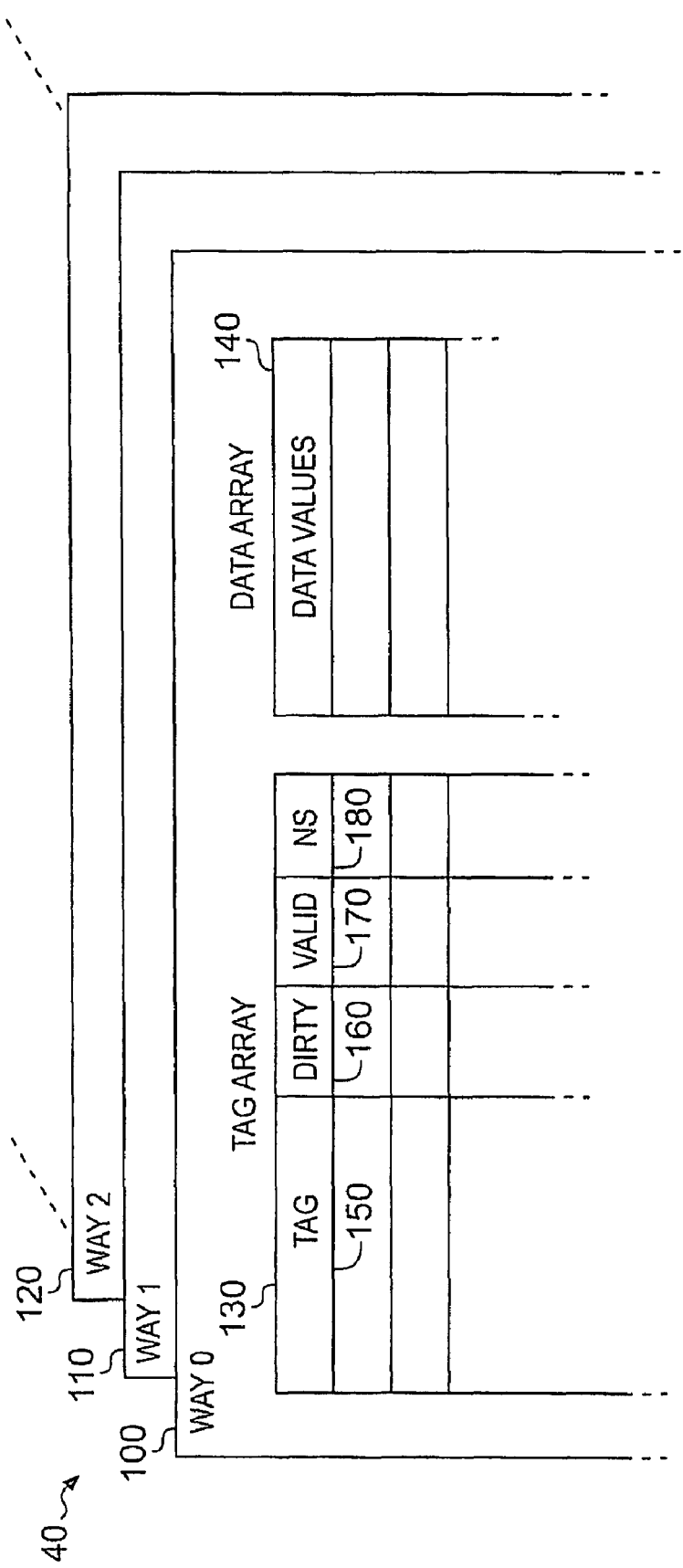
FIG. 2 schematically illustrates a data cache in accordance with one embodiment of the present invention.

FIG. 2 illustrates a cache such as the system cache 40 of FIG. 1. Such a cache will typically be divided into several ways (100, 110, 120 etc). Each way stores data in an array which will commonly be divided into a TAG array 130 and data array 140. Copies of data items stored in memory 30 are stored in the entries of data array 140, whilst additional information associated with those data items are stored in TAG array 130. These associated pieces of information may typically comprise a TAG 150, a dirty bit 160, a valid bit 170 and an NS bit 180. The TAG corresponds to a portion of the memory address of the corresponding data items in data array 140. The dirty bit 160 and valid bit 170 indicate whether the corresponding data items have been updated since initially stored in this cache line and whether the data items in this cache line are still valid, respectively. The NS bit corresponds to the security domain associated with this cache line. Hence, a cache line filled by data being the subject of a secure access will have the NS bit set to 0 and a cache line filled by data being the subject of a non-secure access will have the NS bit set to 1. This enables the cache to be shared by both the secure domain and the non-secure domain, without risk that non-secure processes may access secure data. This is because a data access request from a particular security domain will only be able to access cache lines in the cache whose NS bit matches that security domain.

Figure 3:
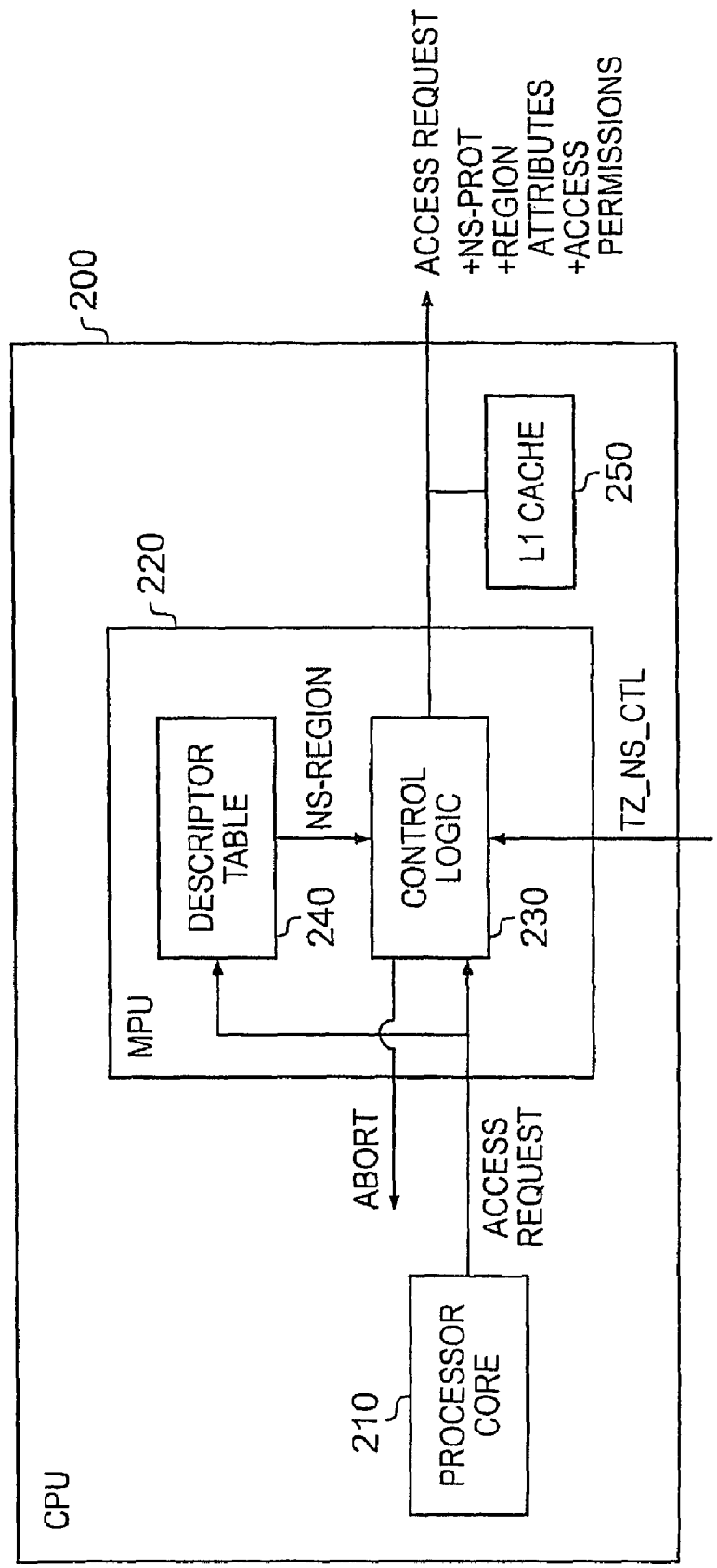
FIG. 3 is a block diagram of a bus master device in accordance with one embodiment of the present invention.

FIG. 3 illustrates the CPU 200 within bus master 50. Within CPU 200 processor core 210 issues access requests and transmits or receives data the subject of the access request. Access requests from processor core 210 are passed to control logic 230 within memory protection unit (MPU) 220. The TZ_NS_CTL signal generated by security control logic 60 is received by control logic 230. Within MPU 220, descriptor table 240 is also passed the access requests issued by processor core 210. Since processor core 210 does not receive the domain specifying signal TZ_NS_CTL, the processor core itself is not security domain aware, but rather a domain security indication is created by MPU 220 in dependence on the access request received from processor core 210, the domain specifying signal TZ_NS_CTL and the information stored in descriptor table 240. The logic according to which the domain security indication (NS-prot) is produced is summarised in Table 1.

According to the logic illustrated in Table 1 non-secure=0 and secure=1. When TZ_NS_CTL=1 (i.e. CPU 200 is set to operate in the non-secure domain) the security indication (NS-prot) generated is always 1, meaning that a core operating in the non-secure domain can only generate non-secure accesses. Alternatively, if the memory protection unit is not enabled (MPU enable=0) whilst the core is set to operate in the secure domain (TZ_NS_CTL=0) then the security indication NS-prot is determined according to a default memory map as shown in Table 2 (described below). If however the CPU is set to operate in the secure domain (TZ_NS_CTL=0) and the MPU is enabled (MPU enable=1) then the security indication NS-prot is determined according to the value of the quantity NS-region.

TABLE I

| TZ_NS_CTL | MPU enable | NS-region | NS-prot | Description |
|---|---|---|---|---|
| 0 | 0 | X | 0/1 | Secure/non-secure access according to address range in Table 2 |
| 0 | 1 | 0 | 0 | Secure access |
| 0 | 1 | 1 | 1 | Non-secure access |
| 1 | X | X | 1 | Non-secure access |

Descriptor table 240 stores a list of memory address regions and their corresponding NS-region values. A data access request corresponding to an address falling within a given memory address region will cause descriptor table 240 to generate a value of NS-region corresponding to that stored in the list. Whilst it will be appreciated that the list stored in descriptor table 240 could take a variety of forms, in one embodiment NS-region is an attribute of the MPU Region Access Control Register. These registers are configured to reset to a logical value of zero, i.e. by default operation in the secure domain will produce secure accesses. It should be noted that in one embodiment the switching of NS-prot defined in Table 1 is only applied to data access requests. In such embodiments instruction access requests always match the security of the security domain. This ensures that only data may be shared between secure and non-secure domains, not instructions. Hence control logic 230 passes access requests from processor core 210 to the bus 10 appending a suitable value of NS-prot. Control logic 230 may also pass and/or append region attributes and access permissions to an access request (e.g. read/write permissions, (non-)cacheable, etc. as appropriate).

As also shown in FIG. 1, the CPU 200 may incorporate a level one cache 250, which may be a unified instruction and data cache, or may be formed as separate instruction and data caches. Typically, for a cacheable access request, the control logic 230 will cause a lookup procedure to be performed in the level one cache 250 prior to the access request being propagated onto the bus 10, and if the level one cache 250 contains the data item or data items which are the subject of the access request, then the access request proceeds with reference to the level one cache 250 without the need for the access request to be propagated onto the bus 10. If the address specified by the access request relates to a write back region of memory, then the update can take place in the level one cache without at the same time performing the update in system cache 40 and/or memory 30, although the dirty bit (analogous to the dirty bit 160 of FIG. 2) will be set to indicate the need to later update the entry in the system cache 40/memory 30 with the entry in the cache. If however the address relates to a write through region, then typically the update will take place in the level one cache 250 and at the same time the access request will also be propagated via the bus 10 to the system cache 40/memory 30 to cause the update to take place in system cache/memory.

Table 2 illustrates an example default memory map. Such a default memory map defines what the security status of access requests to particular regions of memory should be, when TZ_NS_CTL=0 (i.e. secure domain operation), and other access attributes (see below). A default memory map may be used for CPUs which do not implement a MPU or for CPUs which do have an MPU which is either disabled (see first line of Table 1) or for access requests whose address is not covered by a region descriptor (an hence for which a value of NS-region is not defined).

defined such as shared/non-shared and either non-cacheable, write through (WT) cacheable or write back write allocate (WBWA) cacheable.

Figure 4:
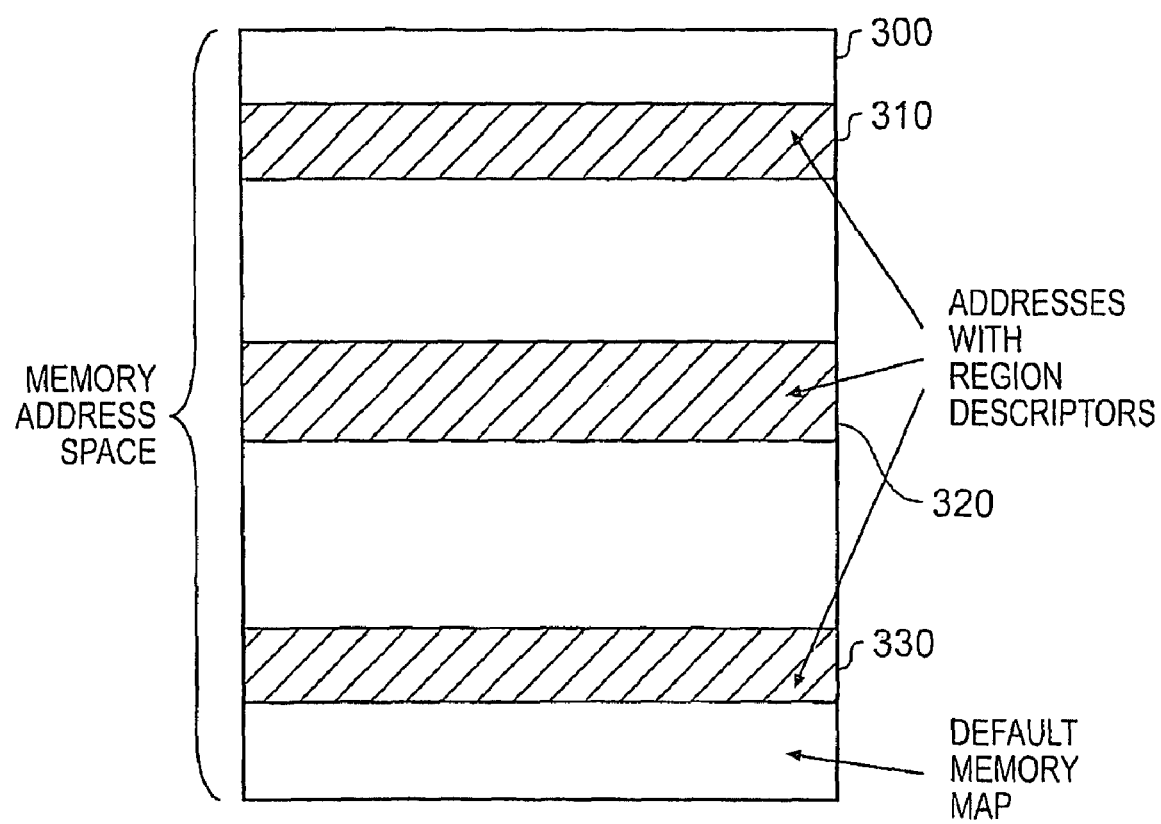
FIG. 4 schematically illustrates a portion of memory address space in accordance with one embodiment of the present invention.

FIG. 4 schematically illustrates a region of memory address space 300 within which three sub-regions of addresses 310, 320 and 330 are defined for which region descriptors stored in descriptor table 240 exist. The remainder of memory address space 300 consists of memory address regions for which no region descriptor exists (i.e. no value of NS-region is defined) and for these regions the default memory map (Table 2) may be used (or alternatively accesses to such regions result in an abort).

Figure 5:
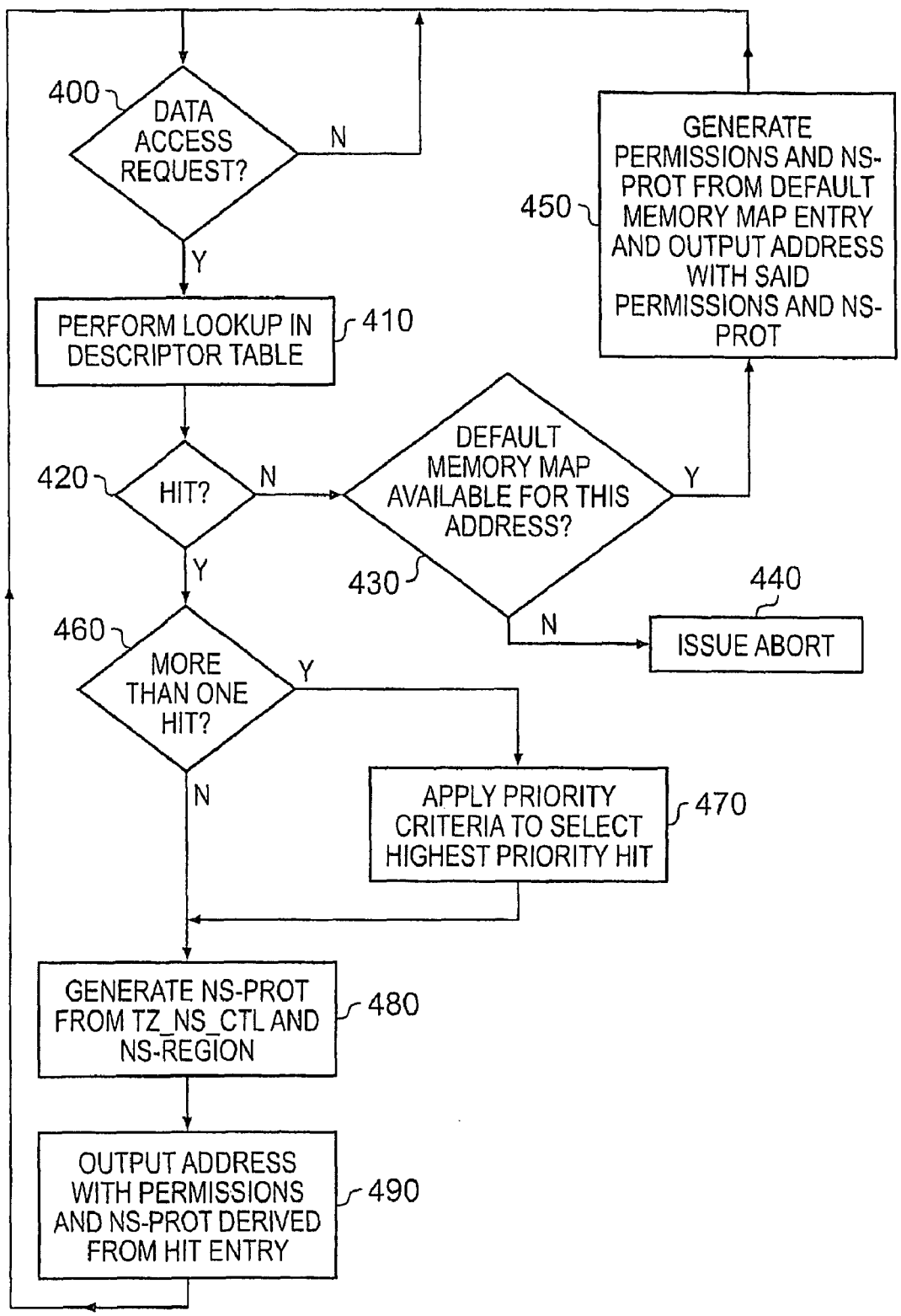
FIG. 5 is a flow diagram illustrating the operation of the control logic of FIG. 3 in accordance with one embodiment of the present invention.

FIG. 5 is a flow diagram illustrating the operation of the control logic 230 of FIG. 3 in accordance with one embodiment of the present invention. At step 400 control logic 230 waits for a data access request to be received from processor core 210. Once a data access request is received at step 410 a lookup in descriptor table 240 is performed. If then at step 420 it is established that no hit has occurred, then it is checked at step 430 whether a default memory map entry is available for the corresponding address. If there is not, an abort is issued

TABLE 2

| Address range | NS-prot when TZ_NS_CTL = 0 | Instruction Memory Type | | Data Memory Type | | |
|---|---|---|---|---|---|---|
| | | ICache enabled | ICache disabled | DCache enabled | DCache disabled | Execute |
| 0xE0000000 to 0xFFFFFFFF | Non-secure | N/A | N/A | Strongly ordered | Strongly ordered | Execute never |
| 0xC0000000 to 0xDFFFFFFF | Secure | | | | | |
| 0xB0000000 to 0xBFFFFFFF | Non-secure | N/A | N/A | Shared device | Shared device | Execute never |
| 0xA0000000 to 0xAFFFFFFF | Secure | | | | | |
| 0x90000000 to 0x9FFFFFFF | Non-secure | N/A | N/A | Non-shared device | Non-shared device | Execute never |
| 0x80000000 to 0x8FFFFFFF | Secure | | | | | |
| 0x70000000 to 0x7FFFFFFF | Non-secure | Normal, WT Cacheable, Non-shared | Normal, non-cacheable, Non-shared | Normal, Non-cacheable, Shared | Normal, Non-cacheable, Shared | Inst'n execution permitted |
| 0x60000000 to 0x6FFFFFFF | Secure | | | | | |
| 0x50000000 to 0x5FFFFFFF | Non-secure | Normal, WT Cacheable, Non-shared | Normal, non-cacheable, Non-shared | Normal, WT Cacheable, Non-shared | Normal, non-cacheable, Shared | Inst'n execution permitted |
| 0x40000000 to 0x4FFFFFFF | Secure | | | | | |
| 0x20000000 to 0x3FFFFFFF | Non-secure | Normal, WT Cacheable, Non-shared | Normal, Non-cacheable, Non-shared | Normal, WBWA Cacheable, Non-shared | Normal, Non-cacheable, Shared | Inst'n execution permitted |
| 0x00000000 to 0x1FFFFFFF | Secure | | | | | |

In the above Table 2, in one embodiment an NS-prot value of non-secure is given by a logic 1 value and an NS-prot value of secure is given by a logic 0 value.

In the example memory map of Table 2 the upper six memory address ranges are allocated for data storage only and the lower six memory address regions are allocated for either instruction storage or data storage. For the data-only memory, no execution of stored data items is possible, and an instruction access request to an address in this region will abort. The data-only memory is subdivided into regions which are strongly ordered (i.e. not cached) and shared/non-shared (i.e. can or can not, respectively, be subjected to hardware coherency schemes within a multiprocessor device).

The lower six memory address regions permit instruction execution. These memory regions have other access attributes (step 440). If there is a default memory map entry for this address, then NS-prot is generated from that information (step 450), and the address is outputted with that NS-prot value and the required permissions. If there is a hit at step 420, then it is checked (step 460) whether more than one hit has occurred in the descriptor table. This is a possibility in this embodiment, wherein multiple overlapping region descriptors are possible, e.g. a common region descriptor defined for all addresses in a particular memory device and specific region descriptors also defined for certain addresses within that device. If there is more than one hit then at step 470 priority criteria are applied to select the highest priority hit, i.e. amongst all the region descriptors defined for a given address, the one with the highest priority is taken. At step 480 control logic 230 generates a value of NS-prot according to the received value of TZ_NS_CTL and the NS-region value of the selected region descriptor. Finally at step 490 the data access request is output either onto bus 10 or directly into level one cache 250 with an associated NS-prot value and permissions as necessary.

In summary, from the above description of an embodiment of the present invention, it will be appreciated that a data processing apparatus and method for generating access requests is provided. A bus master is provided which can operate either in a secure domain or a non-secure domain of the data processing apparatus, according to a signal received from external to the bus master. The signal is generated to be fixed during normal operation of the bus master. Control logic is provided which, when the bus master device is operating in a secure domain, is operable to generate a domain specifying signal associated with an access request generated by the bus master core indicating either secure or non-secure access, in dependence on either a default memory map or securely defined memory region descriptors. Thus, the bus master operating in a secure domain can generate both secure and non-secure accesses, without itself being able to switch between secure and non-secure operation.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A data processing apparatus having a plurality of domains in which devices of the data processing apparatus can operate, said plurality of domains comprising at least one non-secure domain and at least one secure domain, in the secure domain said devices having access to secure data not accessible from the non-secure domain, comprising:
    a bus master device fixed in a particular domain and configured to issue an access request when access to data is required, the access request specifying an address for said data;
    a bus over which said access request is routed to a slave device, each access request routed over the bus having a domain security signal associated therewith identifying a domain pertaining to that access request; and
    said bus master device having domain control logic configured to receive a domain specifying signal generated externally to the bus master device to identify the domain in which the bus master device is fixed, if that domain specifying signal indicates that the bus master device is fixed in the secure domain the domain control logic is configured to selectively generate, in dependence on said address specified by said access request, a non-secure domain security signal to be associated with said access request.

2. A data processing apparatus as claimed in claim 1, wherein said domain control logic has access to a memory map identifying access control information for each of a number of memory regions and an indication of the domain security signal that should be issued in association with an access request specifying an address within that memory region if the access request is issued by the bus master device whilst operating in the secure domain.

3. A data processing apparatus as claimed in claim 1, wherein said domain control logic has access to region descriptors, each region descriptor being associated with a memory region and providing a region security indication for that memory region, said region descriptors programmable by predetermined software executing in the secure domain, said domain control logic configured to derive said domain security signal for each access request from a combination of said domain specifying signal and said region security indication of the region descriptor for the memory region containing the address specified by the access request.

4. A data processing apparatus as claimed in claim 3, wherein said domain control logic is configured to generate said domain security signal in dependence on said region security indication when said domain specifying signal indicates that the bus master device is fixed in the secure domain.

5. A data processing apparatus as claimed in claim 3, wherein said domain control logic has access to a memory map identifying access control information for each of a number of memory regions and an indication of the domain security signal that should be issued in association with an access request specifying an address within that memory region if the access request is issued by the bus master device whilst operating in the secure domain, wherein if said address is in a memory region having a region descriptor, said domain security signal is derived from said combination of said region security indication and said domain specifying signal, whereas otherwise said domain security signal is derived from said access control information obtained from said memory map.

6. A data processing apparatus as claimed in claim 1, wherein said domain control logic is configured to always generate said domain security signal as non-secure, when said domain specifying signal indicates that the bus master device is fixed in the non-secure domain.

7. A data processing apparatus as claimed in claim 1, wherein said domain specifying signal is a static input to said bus master device.

8. A data processing apparatus as claimed in claim 1, further comprising security control logic configured to generate said domain specifying signal.

9. A data processing apparatus as claimed in claim 1, wherein said domain specifying signal is only changeable on reset of said bus master device.

10. A data processing apparatus as claimed in claim 8, wherein said bus master device begins operation in the secure domain at boot-time, said security control logic is configured to switch to generating a non-secure domain specifying signal later in the boot process and said security control logic is configured thereafter to only produce a non-secure domain specifying signal until a reboot occurs.

11. A data processing apparatus having a plurality of domains in which devices of the data processing apparatus can operate, said plurality of domains comprising at least one non-secure domain and at least one secure domain, in the secure domain said devices having access to secure data not accessible from the non-secure domain, comprising:
    bus master means, fixed in a particular domain, for issuing an access request when access to data is required, the access request specifying an address for said data;
    bus means for routing said access request to a slave device, each access request routed over the bus means having a domain security signal associated therewith identifying a domain pertaining to that access request; and
    said bus master means having domain control logic means for receiving a domain specifying signal generated externally to the bus master means to identify the domain in which the bus master means is fixed, if that domain specifying signal indicates that the bus master means is fixed in the secure domain the domain control logic means selectively generating, in dependence on said address specified by said access request, a non-secure domain security signal to be associated with said access request.

12. A method of generating access requests in a data processing apparatus having a plurality of domains in which devices of the data processing apparatus can operate, said plurality of domains comprising at least one non-secure domain and at least one secure domain, in the secure domain said devices having access to secure data not accessible from the non-secure domain, comprising the steps of:

generating a domain specifying signal externally to a bus master device to identify the domain in which the bus master device is fixed;

issuing from said bus master device an access request when access to data is required, said access request specifying an address for said data;

associating a domain security signal with said access request, identifying a domain pertaining to that access request; and if said domain specifying signal indicates that said bus master device is fixed in said secure domain, selectively generating, in dependence on said address, a non-secure domain security signal to be associated with said access request.

* * * * *